(12) United States Patent
Lockenour

(10) Patent No.: US 11,943,691 B2
(45) Date of Patent: *Mar. 26, 2024

(54) SYSTEMS AND METHODS FOR HANDLING COMMUNICATIONS DURING USER OPERATION OF A MOTOR VEHICLE

(71) Applicant: State Farm Mutual Automobile Insurance Company, Bloomington, IL (US)

(72) Inventor: Frankie Lockenour, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/310,281

(22) Filed: May 1, 2023

(65) Prior Publication Data
US 2023/0269569 A1    Aug. 24, 2023

Related U.S. Application Data

(63) Continuation of application No. 17/170,097, filed on Feb. 8, 2021, now Pat. No. 11,678,162, which is a (Continued)

(51) Int. Cl.
*H04W 4/80* (2018.01)
*G07C 5/00* (2006.01)
(Continued)

(52) U.S. Cl.
CPC .............. *H04W 4/80* (2018.02); *G07C 5/008* (2013.01); *H04M 3/06* (2013.01);
(Continued)

(58) Field of Classification Search
CPC ........... H04W 4/80; H04W 4/14; H04W 4/44; H04W 4/48; G07C 5/008; G07C 2205/02;
(Continued)

(56) References Cited

U.S. PATENT DOCUMENTS 7,236,776 B2    6/2007    Nath
8,103,292 B2    1/2012    Kelly
(Continued)

FOREIGN PATENT DOCUMENTS

WO    2004061393 A1    7/2004
WO    2007044212 A2    4/2007
(Continued)

*Primary Examiner* — Mahendra R Patel
(74) *Attorney, Agent, or Firm* — Armstrong Teasdale LLP

(57) ABSTRACT

In one aspect, a system for receiving communications while a user operates a motor vehicle is provided. The system may include (1) a BLUETOOTH interface configured to establish a connection to a BLUETOOTH device associated with the motor vehicle, (2) a wireless communication interface configured to receive a wireless communication from a remote device, and (3) a processor coupled to the wireless communication interface and the BLUETOOTH interface, and configured to: (a) determine the user is operating the motor vehicle based upon the connection to the BLUETOOTH device, and (b) suppress a notification of the user of receipt of the wireless communication while the user is operating the motor vehicle.

18 Claims, 6 Drawing Sheets

Related U.S. Application Data continuation of application No. 16/589,774, filed on Oct. 1, 2019, now Pat. No. 10,945,111, which is a continuation of application No. 15/660,322, filed on Jul. 26, 2017, now Pat. No. 10,470,020, which is a continuation of application No. 15/056,364, filed on Feb. 29, 2016, now Pat. No. 9,749,470.

(60) Provisional application No. 62/287,628, filed on Jan. 27, 2016.

(51) Int. Cl.
| | | |
|---|---|---|
| *H04M 3/06* | (2006.01) | |
| *H04M 3/42* | (2006.01) | |
| *H04W 4/14* | (2009.01) | |
| *H04W 4/44* | (2018.01) | |
| *H04W 4/48* | (2018.01) | |

(52) U.S. Cl.
CPC ......... *H04M 3/42042* (2013.01); *H04W 4/14* (2013.01); *H04W 4/44* (2018.02); *H04W 4/48* (2018.02); *G07C 2205/02* (2013.01); *H04M 2201/14* (2013.01); *H04M 2250/02* (2013.01)

(58) Field of Classification Search
CPC ............... H04M 3/06; H04M 3/42042; H04M 2201/14; H04M 2250/02
USPC ...................................................... 455/414.1
See application file for complete search history.

(56) References Cited

U.S. PATENT DOCUMENTS

| | | | | |
|---|---|---|---|---|
| 8,213,962 | B2 | 7/2012 | Carr | |
| 8,311,858 | B2* | 11/2012 | Everett | G07C 5/008 |
| | | | | 340/576 |
| 8,478,237 | B1 | 7/2013 | Stenta | |
| 8,532,627 | B1 | 9/2013 | Nassimi | |
| 8,577,344 | B2 | 11/2013 | Kobylarz | |
| 8,666,382 | B2 | 3/2014 | Silver | |
| 8,681,023 | B2* | 3/2014 | Giuli | G08G 1/205 |
| | | | | 340/993 |
| 8,761,821 | B2 | 6/2014 | Tibbitts | |
| 8,787,936 | B2 | 7/2014 | Tibbitts | |
| 8,935,036 | B1* | 1/2015 | Christensen | G08G 1/0129 |
| | | | | 701/29.3 |
| 8,948,790 | B1 | 2/2015 | Kim | |
| 9,031,545 | B1* | 5/2015 | Srey | H04W 4/48 |
| | | | | 455/418 |
| 9,111,316 | B2* | 8/2015 | Fernandes | B60W 40/09 |
| 9,164,957 | B2* | 10/2015 | Hassib | G07C 5/0816 |
| 9,167,418 | B1 | 10/2015 | Tuluca | |
| 9,319,471 | B2* | 4/2016 | Diem | H04W 4/80 |
| 9,578,455 | B2* | 2/2017 | Rork | G07C 5/008 |
| 9,607,449 | B1* | 3/2017 | Chen | G07C 5/008 |
| 9,778,049 | B2* | 10/2017 | Davidson | G01C 21/34 |
| 9,830,665 | B1* | 11/2017 | Healy | B60W 40/09 |
| 9,836,962 | B1* | 12/2017 | Hayward | G08G 1/091 |
| 9,888,080 | B2 | 2/2018 | Miao | |
| 10,185,999 | B1* | 1/2019 | Konrardy | G06Q 40/08 |
| 10,475,127 | B1* | 11/2019 | Potter | B60W 40/08 |
| 2003/0100261 | A1 | 5/2003 | Gusler | |
| 2006/0258379 | A1* | 11/2006 | Oesterling | H04W 4/44 |
| | | | | 455/466 |
| 2007/0253543 | A1 | 11/2007 | Horne | |
| 2008/0299900 | A1 | 12/2008 | Lesyna | |
| 2009/0018731 | A1 | 1/2009 | Grenell | |
| 2009/0253454 | A1 | 10/2009 | Sampson | |
| 2010/0106345 | A1* | 4/2010 | Hwang | G07C 5/008 |
| | | | | 701/2 |
| 2010/0279626 | A1 | 11/2010 | Bradley | |
| 2010/0279627 | A1 | 11/2010 | Bradley | |
| 2011/0009107 | A1 | 1/2011 | Guba | |
| 2011/0065375 | A1 | 3/2011 | Bradley | |
| 2011/0105097 | A1 | 5/2011 | Tadayon | |
| 2011/0118934 | A1* | 5/2011 | Lowrey | G08G 1/20 |
| | | | | 701/31.5 |
| 2011/0295458 | A1 | 12/2011 | Halsey-Fenderson | |
| 2012/0058744 | A1 | 3/2012 | Felt | |
| 2012/0176232 | A1 | 7/2012 | Bantz | |
| 2012/0197486 | A1 | 8/2012 | Elliott | |
| 2012/0268235 | A1 | 10/2012 | Farhan | |
| 2013/0021176 | A1 | 1/2013 | Tu | |
| 2013/0035827 | A1* | 2/2013 | Breed | B60W 40/06 |
| | | | | 701/45 |
| 2013/0151111 | A1 | 6/2013 | Skelton | |
| 2013/0190967 | A1* | 7/2013 | Hassib | G06Q 50/30 |
| | | | | 701/31.5 |
| 2013/0344856 | A1* | 12/2013 | Silver | G06F 16/24578 |
| | | | | 455/418 |
| 2014/0148093 | A1 | 5/2014 | Nguyen | |
| 2014/0155052 | A1 | 6/2014 | Glover | |
| 2014/0257867 | A1* | 9/2014 | Gay | B60R 25/20 |
| | | | | 705/4 |
| 2014/0303842 | A1 | 10/2014 | Boelter | |
| 2014/0309806 | A1* | 10/2014 | Ricci | H04W 12/088 |
| | | | | 701/1 |
| 2014/0364108 | A1 | 12/2014 | Tibbitts | |
| 2015/0244854 | A1 | 8/2015 | Babel | |
| 2015/0271110 | A1 | 9/2015 | Murray | |
| 2016/0044575 | A1 | 2/2016 | Rajeevalochana | |
| 2016/0050315 | A1* | 2/2016 | Malhotra | H04M 1/6075 |
| | | | | 455/414.1 |
| 2016/0212589 | A1* | 7/2016 | Cawse | G07B 15/00 |
| 2016/0247394 | A1* | 8/2016 | Stenneth | G07C 5/0808 |
| 2017/0101054 | A1 | 4/2017 | Dusane | |
| 2017/0206717 | A1* | 7/2017 | Kühnapfel | G06Q 40/08 |

FOREIGN PATENT DOCUMENTS

| | | | | |
|---|---|---|---|---|
| WO | WO-2007044212 A2 * | 4/2007 | ......... | H04L 12/189 |
| WO | 2008151103 A1 | 12/2008 | | |
| WO | WO-2008151103 A1 * | 12/2008 | ............. | G07C 5/008 |
| WO | 2014143624 A1 | 9/2014 | | |

* cited by examiner

SYSTEMS AND METHODS FOR HANDLING COMMUNICATIONS DURING USER OPERATION OF A MOTOR VEHICLE

PRIORITY

This application claims priority to and is a Continuation of U.S. patent application Ser. No. 17/170,097, filed Feb. 8, 2021, titled "Systems and Methods for Handling Communications During User Operation of a Motor Vehicle," which is a Continuation of U.S. patent application Ser. No. 16/589,774, filed Oct. 1, 2019, titled "Systems and Methods for Handling Communications During User Operation of a Motor Vehicle," which is a Continuation of U.S. patent application Ser. No. 15/660,322, filed Jul. 26, 2017, titled "Systems and Methods for Handling Communications During User Operation of a Motor Vehicle," which is a Continuation of U.S. patent application Ser. No. 15/056,364, filed Feb. 29, 2016, titled "Systems and Methods for Handling Communications During User Operation of a Motor Vehicle," which claims the benefit of U.S. Provisional Application No. 62/287,628, filed Jan. 27, 2016, titled "System and Methods for Handling Communications During User Operation of a Motor Vehicle," the entire contents and disclosures of which are incorporated herein by reference in their entirety.

FIELD OF THE INVENTION

The present disclosure relates to handling communications while operating a motor vehicle and, more particularly, to systems and methods for delivering and receiving communications and suppressing notifications at a mobile device while a user of the mobile device is operating a motor vehicle.

BACKGROUND

An increasing number of motor vehicle accidents occur each year as a result of drivers using their mobile devices. Drivers frequently talk on their cellular phones or send and receive text messages while driving. Such behaviors pose significant hazards to the drivers themselves, as well as nearby drivers of other motor vehicles, passengers, pedestrians, and sometimes property.

This problem has been recognized and, to an extent, addressed on several fronts. The auto industry continues to develop features in vehicles to enable hands-free use of mobile devices. Many laws, rules, regulations, and policies are in force to discourage use of mobile devices while operating a motor vehicle. The communications industry similarly encourages users: "don't text and drive." The common sentiment toward the problem is that while mobile devices are ubiquitous in daily life, drivers' attention should be on the road, not their mobile device.

In the auto insurance industry, insurance policies are crafted with a variety of considerations in mind, including, the risk a given driver (i.e., the insured) represents to an auto insurance company (i.e., the insurer). A driver represents risk to an auto insurance company in terms of, for example, the likelihood the driver will be involved in a collision. The auto insurance industry carries a portion of the risk posed by drivers who use their mobile devices while they drive. An auto insurance company may consider various other factors in quantifying the risk a given driver represents, including, for example, age, vehicle, occupation, and place of residence.

An insurance company may be more or less likely to offer certain policy features to a driver based upon their risk. For example, an insurance company may be unwilling to offer low-deductible policies to high-risk drivers. Insurance companies often determine policy premiums according to a given driver's risk. A driver considered a low risk of collision may be offered lower premiums for a collision policy than another driver considered a higher risk of collision. Similarly, a driver who insures an expensive sports car is likely to pay higher premiums for a collision policy than another driver who insures an economy-class, four-door sedan.

BRIEF SUMMARY

The present embodiments may relate to systems and methods for handling communications to and from a user's mobile device while that user is operating a motor vehicle. Many mobile devices utilize BLUETOOTH® for connecting to various other devices, including BLUETOOTH devices associated with motor vehicles. (BLUETOOTH is a registered trademark of Bluetooth Special Interest Group, located in Kirkland, WA). When a mobile device for a user connects to a vehicle's native BLUETOOTH system, or to a BLUETOOTH beacon, an application running on the mobile device may determine the user has entered the vehicle and may be embarking on a trip. Based upon this determination, communications destined for the mobile device, such as voice calls and text messages, may be blocked, or suppressed. More specifically, notifications associated with the communications are suppressed so the user is not distracted while driving the motor vehicle.

In one aspect, a system for receiving communications while a user operates a motor vehicle may be provided. The system may include (1) a BLUETOOTH interface configured to establish a connection to a BLUETOOTH device associated with the motor vehicle, (2) a wireless communication interface configured to receive a wireless communication from a remote device, and (3) a processor coupled to the wireless communication interface and the BLUETOOTH interface, and configured to: (a) determine the user is operating the motor vehicle based upon the connection to the BLUETOOTH device, and (b) suppress a notification of the user of receipt of the wireless communication while the user is operating the motor vehicle.

In another aspect, a method of handling communications to a mobile device while a user operates a motor vehicle may be provided. The method may include (1) establishing a BLUETOOTH connection between the mobile device and a BLUETOOTH device associated with the motor vehicle using a BLUETOOTH interface, (2) recognizing, by a processor, the user is operating the motor vehicle based upon the BLUETOOTH connection, (3) receiving a wireless communication from a remote device at a wireless communication interface, and (4) suppressing a notification of the user of receipt of the wireless communication.

In yet another aspect, a base station for delivering communications to a mobile device may be provided. The base station may include (1) a wireless communication interface configured to receive a wireless communication originating at a remote device and destined for the mobile device, and (2) a processor coupled to the wireless communication interface and configured to: (a) receive an indication a mobile device has established a BLUETOOTH connection with a BLUETOOTH device associated with a motor vehicle, (b) determine a user of the mobile device is operating the motor vehicle based upon the BLUETOOTH connection to the BLUETOOTH device, (c) initiate suppression of communications to the mobile device while the user is operating the motor vehicle, and (d) delay delivery of the wireless communication to the mobile device.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
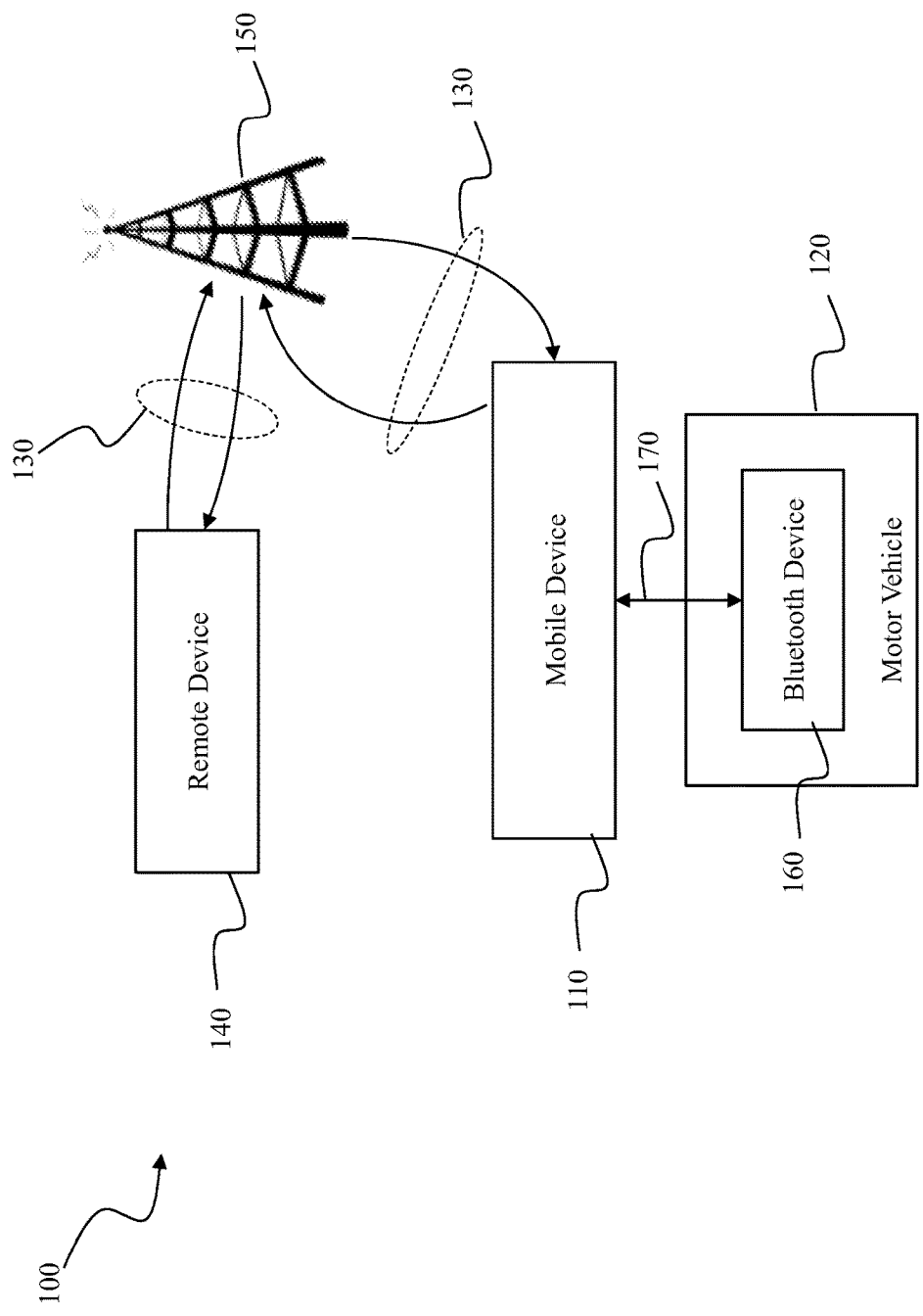
FIG. 1 depicts an exemplary system for handling communications to a mobile device while a user operates a motor vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Auto insurance policies and premiums may be crafted based upon the insurers' quantification of insured drivers' risk. Insurance companies (i.e., insurers) utilize a variety of techniques to gauge a particular driver's or class of drivers' risk. These techniques may allow insurers to divide and subdivide insured drivers into various risk pools, where a given driver's risk pool impacts the auto insurance policies available and the premiums (and/or rates, discounts, rewards, points, etc.) at which those policies are available.

The risk a given driver poses may be reduced if that driver is unable to use their mobile device while driving. Assuring the driver will not be distracted by voice calls and text messages improves the driver's focus on the road, and reduces the likelihood the driver is involved in a collision.

Generally, voice calls and text messages originating from a remote user of a remote mobile device, or "user device," are relayed to the destination mobile device by one or more base stations (e.g., cell towers). When the destination mobile device receives the communications, unless on "silent," the mobile device alerts the user via some notification, such as a ringer, chime, chirp, vibration, or other observable notification. If the user is also operating a motor vehicle, any attention of the user drawn by the notification or communication itself, is attention drawn away from the road. It is realized herein that such communications may be blocked on the mobile device while the user is operating the motor vehicle.

Various aspects of using a mobile device are distracting to drivers. Notifications for voice calls, text messages, emails, or other communications may cause drivers to look away from the road to or at least contemplate the origin of the communication, the type of communication, and the contents of the communication. Many drivers yield to the temptation to receive the communication and maybe even respond. This may include taking a voice call, reading a text message or email, or sending a responsive text message or email. It is realized herein that, in many cases, blocking of communications to the mobile device while the user is operating a motor vehicle should include complete suppression of even the notification of the incoming communication until the user is no longer operating the motor vehicle.

Among the various methods of determining when a user is operating a motor vehicle, automatic methods tend to be more effective, as many users don't realize how distracted they become when using their mobile device while driving, and would likely prefer to disable or simply avoid enabling any feature that may block communications or suppress notifications. This is particularly true in younger, less-experienced drivers. It is realized herein that blocking of communications or suppression of notifications may be enabled and disabled on the mobile device itself, or remotely via a network interface. Enabling and disabling may also be password protected, akin to parental controls.

One way to determine a motor vehicle is in operation is to collect and monitor telematics data for the motor vehicle. Simple speed and position data may be used to determine the motor vehicle is in operation. Alternatively, a driver's mobile device may connect to a BLUETOOTH device associated with the motor vehicle, such as the motor vehicle's native BLUETOOTH system (e.g., hands-free phone or info-tainment system). Upon establishing a BLUETOOTH connection between the mobile device and the BLUETOOTH device associated with the motor vehicle, an inference may be made that the user is embarking on a trip in the motor vehicle, the user will be driving, and that incoming communications should be blocked or notifications suppressed. Alternatively, a determination may be made based on a combination of the BLUETOOTH connection and the telematics data.

Likewise, telematics data and the BLUETOOTH connection may indicate when the user is no longer operating the motor vehicle. For example, if the BLUETOOTH connection between the mobile device and the BLUETOOTH device associated with the motor vehicle is terminated, an inference may be made that the user's trip is complete, the user is no longer driving, and communications to and from the mobile device may resume. Any communications blocked or notifications suppressed may then be provided to the user on the mobile device.

It is realized herein that blocking communications to a mobile device while the user of the mobile device is driving a motor vehicle may disrupt important communication bound for the user. Voice calls bound for the mobile device may be listed as missed calls upon completion of the user's trip. In certain embodiments, voice callers may be greeted with a voice or text message indicating the user is driving and the user will return their call at a more appropriate time. Similarly, automated text responses may be sent to originators of text messages indicating the user is driving and unable to receive or send text messages until their trip is complete.

It is realized herein that emergencies may arise where blocking of communications and notifications to a mobile device is undesirable. Blocking or suppression of communications may be bypassed in certain circumstances. Such a bypass may be had by designated emergency contacts, or by some form of authentication of the emergency. For example, a voice caller may be presented a voice prompt to enter a bypass code in case of emergency.

The technical effect achieved by this system may be at least one of: (a) recognizing when a user of a mobile device is operating a motor vehicle based on telematics and BLUETOOTH connectivity; (b) reducing distraction for operators of motor vehicles by blocking communications to their mobile device or suppressing notifications; (c) delaying notification of incoming communications on a user's mobile device while operating a motor vehicle; and (d) reducing drivers' risk of collision by improving their attention to the road.

A technical effect of the systems and processes described herein may be achieved by performing at least one of the following steps: (i) establishing a BLUETOOTH connection between a mobile device and a BLUETOOTH device associated with a motor vehicle; (ii) recognizing the user is operating the motor vehicle based upon the BLUETOOTH connection; (iii) receiving a wireless communication from a remote device; and (iv) suppressing notification of receipt of the wireless communication to the user.

As used herein, "user device" refers generally to any device capable of accessing the Internet including, but not limited to, a desktop computer, or a mobile device (e.g., a laptop computer, a personal digital assistant (PDA), a cellular phone, a smartphone, a tablet, a phablet, smart glasses, a smart watch or other wearable computing device, or netbook), or other mobile device or web-based connectable equipment.

Exemplary System

FIG. 1 depicts an exemplary system 100 for handling communications to a mobile device 110 while a user operates a motor vehicle 120. Mobile device 110 is a user device capable of sending and receiving wireless communications 130, including voice telephone calls and text messages. In certain embodiments, mobile device 110 may be a cellular phone with voice and text capability. In alternative embodiments, mobile device 110 may be a PDA or smartphone. Generally, mobile device 110 sends and receives wireless communications 130 to and from remote devices, such as remote device 140. Wireless communications 130 between mobile device 110 and remote device 140 are typically indirect, being relayed by one or more wireless base stations, such as wireless base station 150. FIG. 1 depicts a single wireless base station 150, although system 100 may include multiple wireless base stations and wireless communications 130 are often relayed by multiple wireless base stations, the plurality of which are omitted in FIG. 1 for clarity.

Generally, mobile device 110 receives wireless communications 130 from remote device 140 and provides a notification to a user of mobile device 110. Such notification may include a ringer, tone, chime, or any other audible alert. The notification may also include a vibration, pulse, or other haptic alert. The notification may also include a visual alert, such as an incoming message indicator, an incoming call display or image, or a new message display or image. In certain cases, mobile device 110 may be in a "silent" mode, in which audible alerts are suppressed. In certain embodiments, the silent mode may further suppress haptic and visual alerts as well.

In one embodiment, for example, mobile device 110 may be configured to provide a ringer for an incoming call. Mobile device 110 may be configured to execute a telephone application upon receipt of the incoming call. The telephone application may cause mobile device 110 to display an incoming call display, which may include the originating phone number and an identification of the originating user of remote device 140. The incoming call display may facilitate the user's answering or ignoring the incoming call. Similarly, mobile device 110 may be configured to provide a chime upon receiving a new text message. Mobile device 110 may be further configured to display an incoming message icon. In certain embodiments, mobile device 110 may be configured to open the received text message and display its contents.

Motor vehicle 120 is associated with a BLUETOOTH device 160. BLUETOOTH device 160 may be a BLUETOOTH system native to motor vehicle 120, such as a hands-free telephone system, or an info-tainment system. Alternatively, BLUETOOTH device 160 may include a BLUETOOTH beacon. Such a BLUETOOTH beacon may be configured to be powered by motor vehicle 120. BLUETOOTH device 160 may be connected to mobile device 110 by a BLUETOOTH connection 170.

Exemplary Mobile Device

Figure 2:
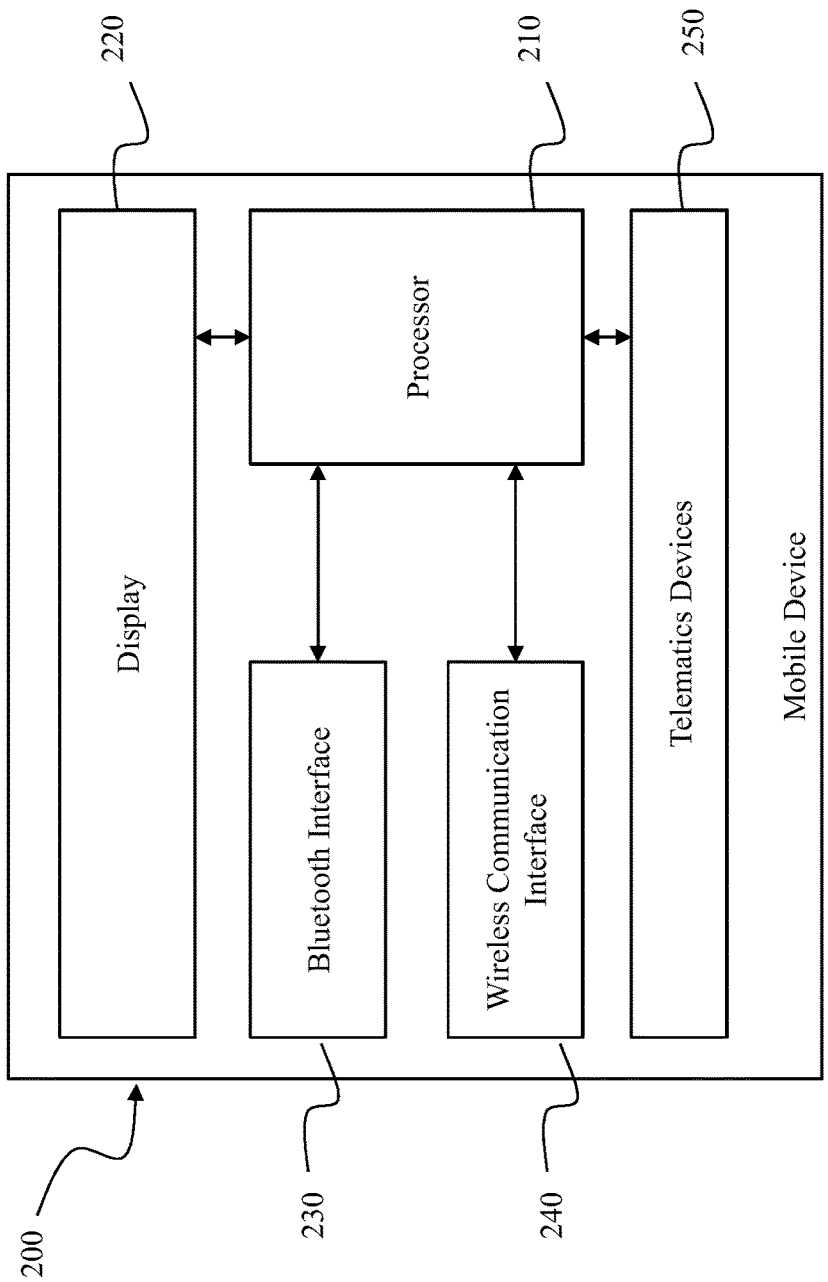
FIG. 2 depicts an exemplary mobile device.

FIG. 2 depicts a block diagram of an exemplary mobile device 200. Mobile device 200 includes a processor 210, a display 220, a BLUETOOTH interface 230, a wireless communication interface 240, and telematics devices 250. Processor 210 is coupled to display 220 such that, by executing program instructions, processor 210 controls display of images, icons, and application screens on display 220. Processor 210 is further coupled to BLUETOOTH interface 230 such that, by executing program instructions, processor 210 sends and receives data over a BLUETOOTH connection between mobile device 200 and another BLUETOOTH device. Processor 210 is further coupled to wireless communication interface 240 such that, by executing program instructions, processor 210 sends and receives wireless communications to and from one or more remote devices, such as remote device 140. Processor 210 is further coupled to telematics devices 250 such that processor 210 receives telematics data generated by telematics devices 250.

BLUETOOTH interface 230 may include a BLUETOOTH antenna, encoders, decoders, transceivers, or any other components necessary for carrying out BLUETOOTH communication. BLUETOOTH interface 230 establishes a BLUETOOTH connection with a BLUETOOTH device associated with a motor vehicle, such as BLUETOOTH device 160 associated with motor vehicle 120. Processor 210 receives data indicating the status of the BLUETOOTH connection, including whether the BLUETOOTH connection is established, terminated, or in use. Based upon the BLUETOOTH connection, processor 210 determines whether the user of mobile device 200 is operating motor vehicle 120. Once the BLUETOOTH connection is established, processor 210 determines the user has entered the vehicle and is embarking on a trip that will continue for a period of time. When the BLUETOOTH connection is terminated, processor 210 determines the user has completed the trip.

In certain embodiments, processor 210 also receives telematics data for motor vehicle 120 from telematics devices 250. Processor 210 may determine when the user embarks and completes a trip based upon the telematics data alone, or in combination with the BLUETOOTH connection. For example, processor 210 may determine the trip has begun based upon speed and position data collected by telematics devices 250. In certain embodiments, processor 210 may determine the trip has begun based upon both the BLUETOOTH connection being established and the speed rising above a threshold. In certain embodiments, other telematics devices may be installed on motor vehicle 120 and send telematics data to mobile device 200 using BLUETOOTH Interface 230 or any other suitable communication channel, such as, for example, universal serial bus (USB). Telematics devices installed in motor vehicle 120 may be in addition to or in place of telematics devices 250 on mobile device 200.

Mobile device 200 sends and receives wireless communications using wireless communication interface 240. Wireless communication interface 240 may include a radio frequency (RF) antenna, encoders, decoders, transceivers, and any other components necessary for carrying out wireless communications, including, for example, voice telephone calls and text messages. Wireless communications received over wireless communication interface 240 are further processed by processor 210, which may include decoding, demodulating, translating, or any other suitable processes for receiving the wireless communication.

Typically, when a wireless communication is received by mobile device 200, processor 210 may generate a notification to the user to alert the user of receipt of the incoming wireless communication. The notification may include an audible alert, a haptic alert, or a visual alert.

When processor 210 determines the user has begun a trip, processor 210 initiates suppression of notifications of the user of incoming wireless communications. Suppression of notifications may include suppression of audible, haptic, or visual alerts that the incoming wireless communications have been received. For example, a telephone ringer for an incoming voice call may be suppressed. Further, no visual alert of the incoming voice call is displayed.

In certain embodiments, processor 210 initiates the suppression of notifications by instructing wireless base stations, such as wireless base station 150, to delay delivery of wireless communications during the trip. Delaying delivery of wireless communications also delays processing by processor 210 that would generate typical notifications to the user. In other embodiments, processor 210 may provide information about the BLUETOOTH connection or telematics data to wireless base station 150, which determines itself whether the user of mobile device 200 has begun a trip and is operating motor vehicle 120.

During the trip, processor 210 may initiate an automatic response to remote device 140 using wireless communication interface 240. An automatic response may include an indication the user is operating the motor vehicle.

In certain embodiments, processor 210 prompts the user for authorization to enable and disable suppression of notifications. The prompt may be displayed on display 220. Processor 210 may, in certain embodiments, bypass suppression of notifications to the user. Bypass of suppression of notifications may be provided by voice or textual prompt of a user of the originating remote device for the wireless communication. For example, a second user of remote device 140 may be prompted during a voice call to mobile device 200. Similarly, a text message prompt may be sent to the remote device requesting authorization for bypass. Authorization for bypass may be password protected. In alternative embodiments, bypass may be automatically authorized for emergency contacts.

Exemplary Wireless Base Station

Figure 3:
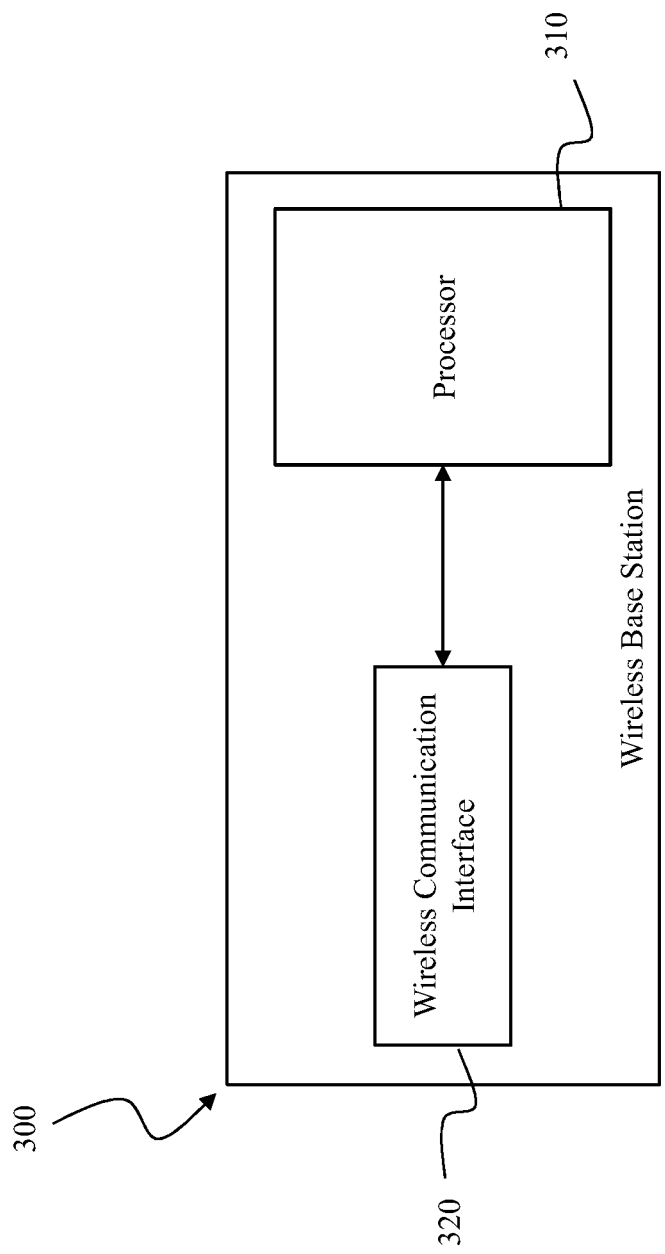
FIG. 3 depicts an exemplary wireless base station.

FIG. 3 depicts a block diagram of an exemplary wireless base station 300, such as wireless base station 150, shown in FIG. 1. Wireless base station 300 includes a processor 310 and a wireless communication interface 320. Generally, wireless base station 300 relays wireless communication, such as wireless communications 130, from tower-to-tower, or tower-to-mobile device. Wireless communications 130 are sent and received using wireless communication interface 320. Processor 310 processes wireless communications 130 and controls how wireless communications 130 should be transmitted and received.

In certain embodiments, processor 310 receives data from a mobile device, such as mobile device 200, shown in FIG. 2, indicating a BLUETOOTH connection has been established between mobile device 200 and a BLUETOOTH device associated with a motor vehicle, such as BLUETOOTH device 160 associated with motor vehicle 120. Processor 310 determines the user of mobile device 200 is embarking on a trip in motor vehicle 120 and initiates suppression of notification of the user for incoming wireless communications. Processor 310 may delay delivery of incoming wireless communications to mobile device 200, thus delaying the ordinary notifications generated by their receipt by mobile device 200. When the trip is complete, processor 310 causes wireless communication interface 320 to deliver the wireless communications. When the delayed wireless communications are received, they may include notifications of missed calls or, for text messages, a queue of new text messages.

Exemplary Methods

Figure 4:
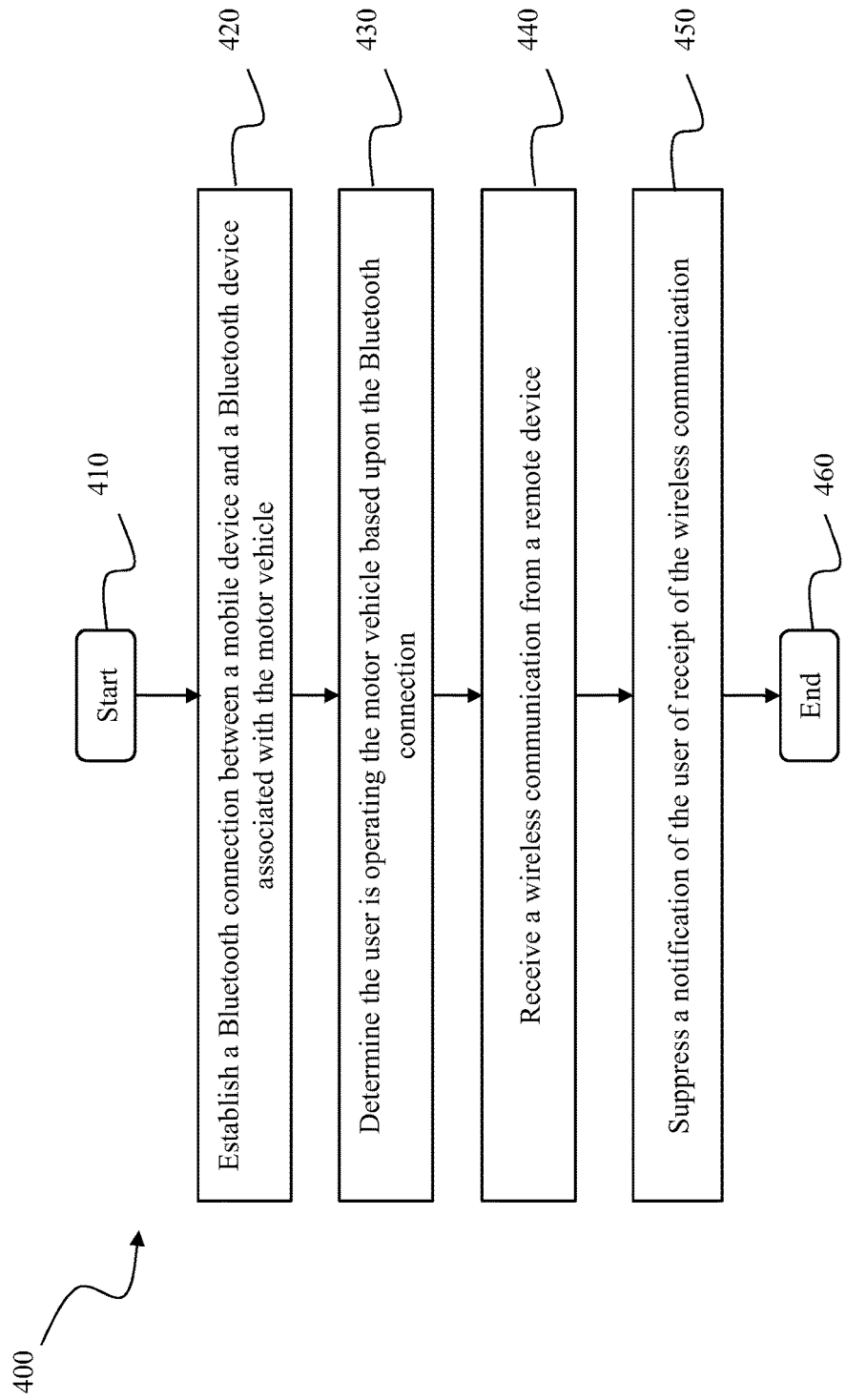
FIG. 4 depicts a flow diagram for an exemplary method of handling communications to a mobile device while a user operates a motor vehicle.

FIG. 4 depicts flow diagrams of exemplary methods 400, 500, and 600 for handling communications to a mobile device, such as mobile device 200, shown in FIG. 2, while a user of mobile device 200 is operating a motor vehicle, such as motor vehicle 120, shown in FIG. 1.

Method 400 begins at a start step 410. At a BLUETOOTH connection step 420, a BLUETOOTH connection is established between mobile device 200 and a BLUETOOTH device associated with motor vehicle 120, such as BLUETOOTH device 160. Based upon the BLUETOOTH connection, a determination is made, at determination step 430, that the user of mobile device 200 is operating motor vehicle 120. The determination may be made by a processor executing program instructions, such as processor 210 of mobile device 200 or processor 310 of wireless base station 300. In certain embodiments, processor 210 may make the determination based upon telematics data collected by telematics devices, such as telematics devices 250 of mobile device 200, or by other telematics devices on motor vehicle 120. In certain other embodiments, processor 310 may receive the telematics data and BLUETOOTH connection data from mobile device 200 using wireless communications interface 320 and make the determination based upon one or more of the BLUETOOTH connection data and the telematics data.

When the BLUETOOTH connection is established, the processor determines the user has entered and started motor vehicle 120, and further infers that the user is embarking on a trip. In embodiments where telematics data is used, the processor makes further inferences that the trip has begun based upon, for example, speed and position data for motor vehicle 120. For example, the processor may infer the trip has begun when the speed exceeds a threshold. Based upon the determination, communications to mobile device 200 are blocked or notifications of received wireless communications are suppressed.

During the trip, at a receiving step 440, a wireless communication is received from a remote device, such as remote device 140, shown in FIG. 1. The wireless communication is received using a wireless communications interface, such as wireless communications interface 240 of mobile device 200 or wireless communications interface 320 of wireless base station 300. A notification of the user of receipt of the wireless communication is suppressed at a suppression step 450. In one embodiment, at suppression step 450, when the wireless communication is received at wireless communication interface 240, processor 210 suppresses any audible, visual, haptic, or otherwise observable alerts that would ordinarily be provided to the user of mobile device 200. When the trip is complete, processor 210 stops suppressing the notification and mobile device 200 resumes normal operation, which may include presenting the user a list of missed voice calls or a queue of text messages, for example.

Method 400 ends at an end step 460. The method may include additional, less, or alternate actions, including those discussed elsewhere herein.

Figure 5:
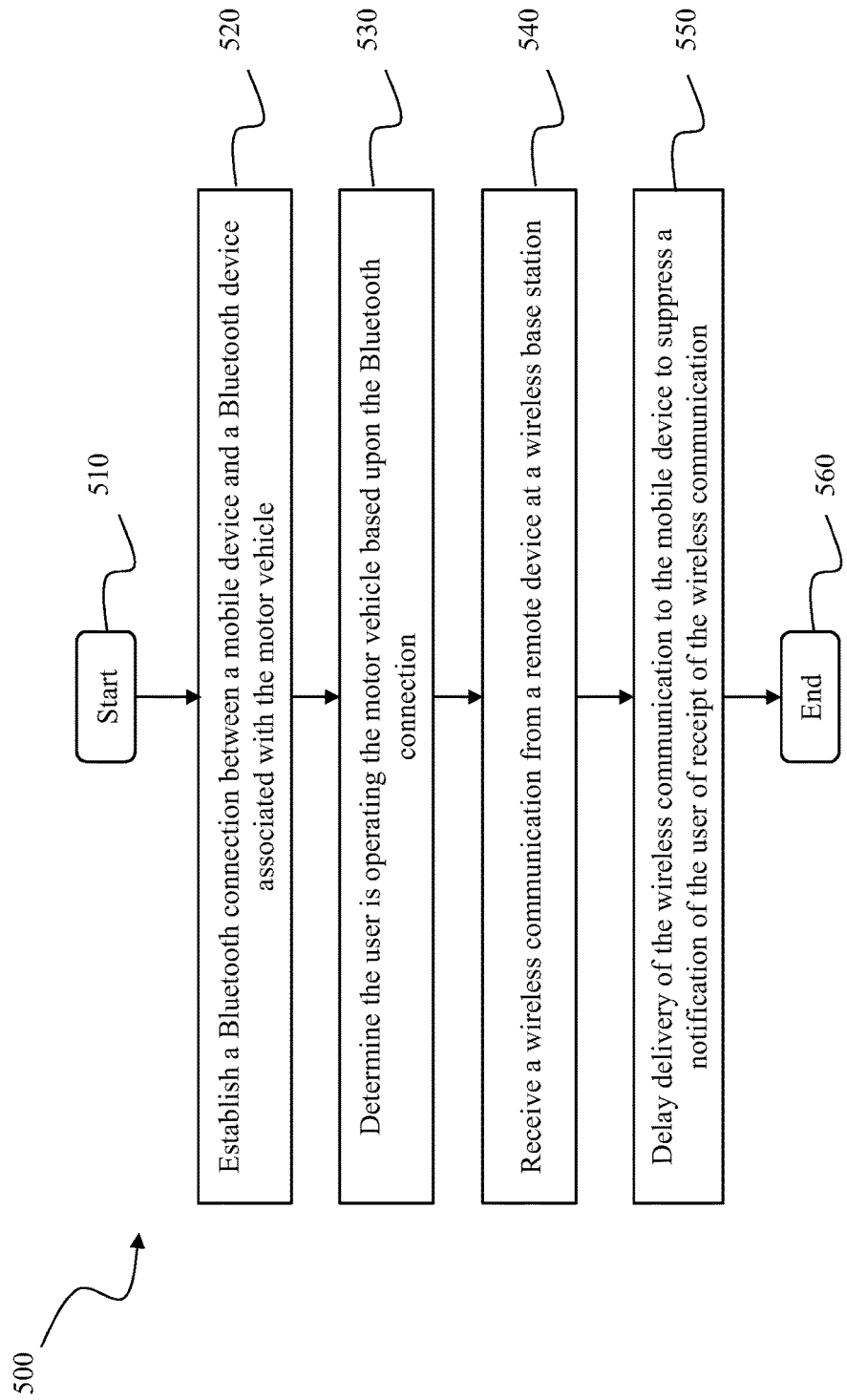
FIG. 5 depicts a flow diagram for an exemplary method of handling communications to a mobile device at a wireless base station.

FIG. 5 depicts a flow diagram of an exemplary method 500 for handling communications to mobile device 200 at a wireless base station, such as wireless base station 300, shown in FIG. 3. Method 500 begins at a start step 510. At a BLUETOOTH connection step 520, a BLUETOOTH connection is established between mobile device 200 and BLUETOOTH device 160 associated with motor vehicle 120. Based upon the BLUETOOTH connection, a determination is made, at a determination step 530, that the user of mobile device 200 is operating motor vehicle 120. The determination may be made by a processor executing program instructions, such as processor 210 of mobile device 200 or processor 310 of wireless base station 300. In certain embodiments, processor 210 may make the determination based upon telematics data collected by telematics devices, such as telematics devices 250 of mobile device 200, or by other telematics devices on motor vehicle 120. In certain other embodiments, processor 310 may receive the telematics data and BLUETOOTH connection data from mobile device 200 using wireless communications interface 320 and make the determination based upon one or more of the BLUETOOTH connection data and the telematics data.

When the BLUETOOTH connection is established, the processor determines the user has entered and started motor vehicle 120, and further infers that the user is embarking on a trip. In embodiments where telematics data is used, the processor makes further inferences that the trip has begun based upon, for example, speed and position data for motor vehicle 120. For example, the processor may infer the trip has begun when the speed exceeds a threshold. Based upon the determination, communications to mobile device 200 are blocked or notifications of received wireless communications are suppressed.

During the trip, at a receiving step 540, a wireless communication is received from remote device 140. The wireless communication is received using wireless communication interface 320 of wireless base station 300. Based upon the determination from determination step 530, processor 310 delays delivery of the wireless communication to mobile device 200 at a delaying step 550. Consequently, at delaying step 550, notification of the user of receipt of the wireless communication is suppressed, because the wireless communication has not reached mobile device 200 or wireless communication interface 240.

When the trip is complete, processor 310 delivers the wireless communication to mobile device 200 and mobile device 200 may provide the user a list of missed voice calls or a queue of text messages, for example.

Method 500 ends at an end step 560. The method may include additional, less, or alternate actions, including those discussed elsewhere herein.

Figure 6:
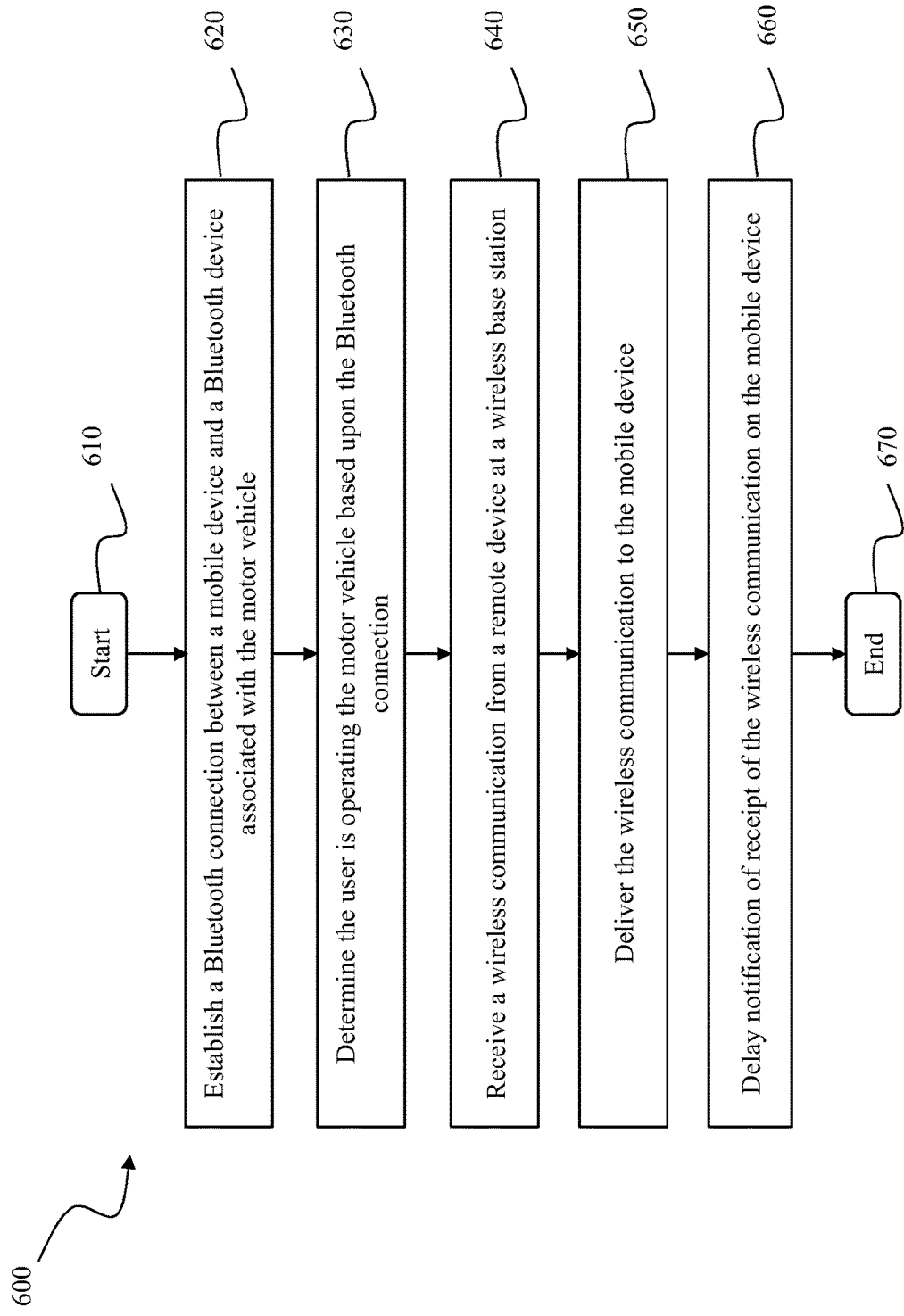
FIG. 6 depicts a flow diagram for another exemplary method of handling communications to a mobile device.

FIG. 6 depicts a flow diagram of an exemplary method 600 for handling communications to mobile device 200. Method 600 begins at a start step 610. At a BLUETOOTH connection step 620, a BLUETOOTH connection is established between mobile device 200 and BLUETOOTH device 160 associated with motor vehicle 120. Based upon the BLUETOOTH connection, a determination is made, at a determination step 630, that the user of mobile device 200 is operating motor vehicle 120. The determination may be made by a processor executing program instructions, such as processor 210 of mobile device 200 or processor 310 of wireless base station 300. In certain embodiments, processor 210 may make the determination based upon telematics data collected by telematics devices, such as telematics devices 250 of mobile device 200, or by other telematics devices on motor vehicle 120. In certain other embodiments, processor 310 may receive the telematics data and BLUETOOTH connection data from mobile device 200 using wireless communications interface 320 and make the determination based upon one or more of the BLUETOOTH connection data and the telematics data.

When the BLUETOOTH connection is established, the processor determines the user has entered and started motor vehicle 120, and further infers that the user is embarking on a trip. In embodiments where telematics data is used, the processor makes further inferences that the trip has begun based upon, for example, speed and position data for motor vehicle 120. For example, the processor may infer the trip has begun when the speed exceeds a threshold. Based upon the determination, communications to mobile device 200 are blocked or notifications of received wireless communications are suppressed.

During the trip, at a receiving step 640, a wireless communication is received from remote device 140. The wireless communication is received using wireless communication interface 320 of wireless base station 300. At a delivery step 650, the wireless communication is delivered to mobile device 200 using wireless communication interface 320 of wireless base station 300 and wireless communication interface 240 of mobile device 200. Based upon the determination from determination step 630, processor 210, at delaying step 660, delays notification of receipt of the wireless communication during the trip. In certain embodiments processor 210 may delay notification per instructions received from wireless base station 300. Processor 310 of wireless base station 300 may generate such instructions based on the determination from determination step 630. In such embodiments, the determination at step 630 may be carried out by processor 210 or processor 310.

Method 600 ends at an end step 670. The method may include additional, less, or alternate actions, including those discussed elsewhere herein.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program may be provided, and the program may be embodied on a computer readable medium. In an exemplary embodiment, the system may be executed on a single computer system, without requiring a connection to a sever computer. In a further embodiment, the system may be run in a Windows® environment (Windows is a registered trademark of Microsoft Corporation, Redmond, Washington). In yet another embodiment, the system may be run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

Telematics data collection may be started and stopped in response to trigger events (e.g., vehicle engine RPM, vehicle movement), such as disclosed by U.S. Pat. No. 8,930,231 (entitled "Methods Using a Mobile Device to Provide Data for Insurance Premiums to a Remote Computer"), which is incorporated herein by reference in its entirety. Collection of telematics data by a mobile device may be started and stopped based upon the mobile device being within BLUETOOTH, Near Field Communication, or other wireless communication technique range of a vehicle-mounted transceiver, such as disclosed by U.S. Pat. No. 8,666,789 (entitled "BLUETOOTH Device to Enable Data Collection for Insurance Rating Purposes"), which is incorporated herein by reference in its entirety.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A wireless server for delivering communications to a mobile device, the wireless server comprising:
 a wireless communication interface configured to receive a wireless communication originating at a remote device and destined for the mobile device; and
 a processor coupled to the wireless communication interface and configured to:
  receive, from the mobile device, telematics data associated with a motor vehicle;
  generate a delay notification instruction based upon the telematics data, the delay notification instruction generated in response to the wireless server having determined that a user of the mobile device has initiated a trip with the motor vehicle based upon speed and position data; and
  transmit the delay notification instruction to the mobile device, the delay notification instruction causing the mobile device to suppress notification of the wireless communication.

2. The wireless server of claim 1, wherein the processor is further configured to delay delivery of the wireless communication to the mobile device based upon the telematics data.

3. The wireless server of claim 1, wherein the telematics data is collected by telematics devices installed on the motor vehicle configured to communicate with the mobile device.

4. The wireless server of claim 1, wherein the processor is further configured to:
generate a prompt enabling the user to bypass suppression of the notification; and
transmit the prompt to the mobile device.

5. The wireless server of claim 4, wherein the processor is further configured to receive a bypass code from the mobile device to bypass suppression of the notification.

6. The wireless server of claim 1, wherein the processor is further configured to determine that the user is operating the motor vehicle based upon the telematics data indicating that a communication channel between the mobile device and the motor vehicle is established.

7. The wireless server of claim 6, wherein the communication channel is a universal serial bus (USB).

8. The wireless server of claim 6, wherein the communication channel is a BLUETOOTH connection.

9. A computer-implemented method for handling communications to a mobile device by a wireless server, the wireless server including a wireless communication interface configured to receive a wireless communication originating at a remote device and destined for the mobile device, the method comprising
receiving, from the mobile device, telematics data associated with a motor vehicle;
generating a delay notification instruction based upon the telematics data, the delay notification instruction generated in response to the wireless server having determined that a user of the mobile device has initiated a trip with the motor vehicle based upon speed and position data; and
transmitting the delay notification instruction to the mobile device, the delay notification instruction causing the mobile device to suppress notification of the wireless communication.

10. The computer-implemented method of claim 9, further comprising delaying delivery of the wireless communication to the mobile device based upon the telematics data.

11. The computer-implemented method of claim 9, wherein the telematics data is collected by telematics devices installed on the motor vehicle configured to communicate with the mobile device.

12. The computer-implemented method of claim 9, further comprising:
generating a prompt enabling the user to bypass suppression of the notification; and
transmitting the prompt to the mobile device.

13. The computer-implemented method of claim 12, further comprising receiving a bypass code from the mobile device to bypass suppression of the notification.

14. The computer-implemented method of claim 9, further comprising determining that the user is operating the motor vehicle based upon the telematics data indicating that a communication channel between the mobile device and the motor vehicle is established.

15. The computer-implemented method of claim 14, wherein the communication channel is a universal serial bus (USB).

16. The computer-implemented method of claim 14, wherein the communication channel is a BLUETOOTH connection.

17. At least one non-transitory computer-readable storage media having computer-executable instructions embodied thereon, wherein when executed by a processor of a wireless server including a wireless communication interface configured to receive a wireless communication originating at a remote device and destined for a mobile device, the computer-executable instructions cause the processor to:
receive, from the mobile device, telematics data associated with a motor vehicle;
generate a delay notification instruction based upon the telematics data, the delay notification instruction generated in response to the wireless server having determined that a user of the mobile device has initiated a trip with the motor vehicle based upon speed and position data; and
transmit the delay notification instruction to the mobile device, the delay notification instruction causing the mobile device to suppress notification of the wireless communication.

18. The at least one non-transitory computer-readable storage media of claim 17, wherein the computer-executable instructions further cause the processor to delay delivery of the wireless communication to the mobile device based upon the telematics data.

* * * * *